(12) United States Patent
Akiyama et al.

(10) Patent No.: US 6,633,435 B2
(45) Date of Patent: Oct. 14, 2003

(54) ILLUMINATION OPTICAL SYSTEM AND PROJECTOR COMPRISING THE SAME

(75) Inventors: Koichi Akiyama, Matsumoto (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/897,721

(22) Filed: Jul. 2, 2001

(65) Prior Publication Data

US 2002/0008910 A1 Jan. 24, 2002

(30) Foreign Application Priority Data

Jul. 6, 2000 (JP) ........................................ 2000-205314

(51) Int. Cl.$^7$ .......................... G02B 27/10; F21V 01/00
(52) U.S. Cl. ........................ 359/619; 359/626; 362/268
(58) Field of Search ................................. 359/619, 626, 359/634, 497, 499; 362/268; 349/9

(56) References Cited

U.S. PATENT DOCUMENTS

| | | | | |
|---|---|---|---|---|
| 6,092,901 A | * | 7/2000 | Hashizume et al. | 349/66 |
| 6,273,569 B1 | * | 8/2001 | Iechika et al. | 353/20 |
| 6,286,961 B1 | * | 9/2001 | Ogawa | 353/31 |
| 2002/0018184 A1 | * | 2/2002 | Ito | 353/30 |

* cited by examiner

*Primary Examiner*—Ricky Mack
(74) *Attorney, Agent, or Firm*—Ladas & Parry

(57) ABSTRACT

The illumination optical system includes a lens array having a plurality of lenses for splitting the light emitted from a light source into a plurality of sub-beams, at least some lenses of the lens array being decentered. The thickness of each of the lenses constituting the lens array is adjusted such that the step difference at the boundaries between the lenses falls within a predetermined step difference.

14 Claims, 9 Drawing Sheets

ILLUMINATION OPTICAL SYSTEM AND PROJECTOR COMPRISING THE SAME

BACKGROUND OF THE INVENTION

1. Field of the Invention

The present invention relates to an illumination optical system to be used for providing increased service efficiency of light and a sharp image, and to a projector including the illumination optical system.

2. Description of the Related Art

FIG. 9 is a perspective external view illustrating a typical projector. Referring to FIG. 9, a rectangular parallelepiped projector 501 includes an upper case 503 which defines the upper surface thereof and is provided with operating buttons 502, a lower case 504 which defines the lower surface of the projector 501, and a front case 505 which defines the front surface of the projector 501. There is a projection lens 506, the front-end portion of which protrudes from the front case 505.

For example, such a projector as mentioned above includes a known optical system configured as shown in FIG. 10.

That is, the projector 501 includes a light source 510, and an illumination optical system 520 for providing a uniform illumination distribution of light emitted from the light source 510 and for allowing the light to impinge upon liquid crystal panels 550R, 550G, 550B with the same polarization. The projector 501 also includes a color beam splitting optical system 530 for splitting a beam W launched from the illumination optical system 520 into red, green, and blue beams R, G, B, and a relay optical system 540 for introducing the blue beam B in the beams R, G, B, which have been split by the color beam splitting optical system 530, into the liquid crystal panel 550B associated with the blue beam B. The projector 501 further includes the three liquid crystal panels 550R, 550G, 550B as light modulating means for modulating each color beam in accordance with given image information, a cross dichroic prism 560 as a color beam combining optical system for combining modulated respective color beams, and the projection lens 506 for expanding combined beams and projecting the beams onto a projection screen.

FIG. 11 is a schematic view illustrating the action of the illumination optical system 520. As shown in FIG. 11, the illumination optical system 520 allows a first lens array 521 to split the light emitted from the light source 510 into a plurality of sub-beams, then the sub-beams to impinge upon a polarization conversion element array 523 via a second lens array 522, and then the polarization conversion element array 523 to provide the respective sub-beams with the same polarization direction. Thereafter, the illumination optical system 520 allows a superimposing lens 524 to superimpose the sub-beams on the image forming area of the liquid crystal panels 550R, 550G, 550B.

The illumination optical system 520 functions as described above to allow polarized light of one type to illuminate uniformly all parts of the respective liquid crystal panels 550R, 550G, 550B. Therefore, when displaying an image with a projector, the system contributes to providing a sharp and high contrast image all over the display area.

Below, the process of providing the same polarization direction (of converting polarization) in the aforementioned illumination optical system 520 will be explained in more detail with reference to FIGS. 11 and 12. FIG. 11 is an enlarged view illustrating part of the illumination optical system 520. The polarization conversion element array 523 is configured to have a polarization splitting film 523b and a reflective film 523c, which are alternately disposed between a plurality of light transmissive members 523a. There is also provided a half-wave plate 523d on the transmission side corresponding to the polarization splitting film 523b. The first lens array 521 splits the light emitted from the light source 510 into a plurality of sub-beams and then condenses the respective sub-beams near the polarization splitting film 523b of the polarization conversion element array 523. Accordingly, condensed images of the respective sub-beams are formed near the polarization splitting film 523b. The condensed images are derived from the light-emitting portion of the light source 510. The incident light upon the polarization splitting film 523b is split into p- and s-polarized beams, and the p-polarized beam which is a transmitted beam is converted into an s-polarized beam with the half-wave plate 523d. On the other hand, the s-polarized beam which is a reflected beam is directed substantially in the same direction as the p-polarized beam at the reflective film 523c and then launched from the polarization conversion element array 523 without any change. As described above, the respective sub-beams that have been split with the first lens array are provided with the same polarization. To achieve such an ideal polarization conversion, it is necessary to allow the incident light upon the polarization conversion element array 523 to impinge only upon the polarization splitting film 523b. This is because incidence of light upon the reflective film 523c would cause the light to be converted reversely in polarization direction. Incidentally, FIG. 11 shows the incidence portion corresponding to the polarization splitting film 523b as an effective incidence portion 523e.

Now, suppose the light-emitting portion of the light source 510 is an ideal point light source and the illumination optical system 520 is an ideal one that has no errors in its design and fabrication. In this case, a condensed point image would be formed near the polarization splitting film 523b. It would be therefore possible in this case to allow the incident light upon the polarization conversion element array 523 to impinge only upon the polarization splitting film 523b. However, in practice, the light-emitting portion of the light source 510 has a given size, thereby providing a given size to the condensed image formed near the polarization splitting film 523b. The size of the condensed image often exceeds that of the effective incident portion 523e in the ideal system. In such a case, as schematically shown in FIG. 12, the effective incident portion 523e may be made larger than that of the ideal system in order to allow the light to impinge only upon the effective incident portion 523e. At this time, it is necessary for the first lens array 521 to direct the sub-beams outwardly except for the central portion thereof. In some cases, some lenses constituting the first lens array 521 are decentered (i.e., the optical axis of the lenses is shifted from their geometric center).

The lenses that constitute the first lens array and are decentered for service have step differences at their boundaries due to differences in shape of their surfaces. The presence of a step difference often produces a portion with a rounded edge (i.e., the edge on the periphery of a lens is not formed at a specified angle but in a curved shape) during the manufacture of the lens array. Incident light upon the rounded edge cannot reach an illuminated area or the image forming area of the liquid crystal panels 550R, 550G, 550B, so that the peripheral portion of the illuminated area becomes dark. Consequently, the portion corresponding to the rounded edge appears as a display shadow in the projected area as shown in FIG. 13 when projecting the light onto the screen, conventionally, it has been obliged to provide an excess illumination margin at the expense of brightness in order to avoid the display shadow.

SUMMARY OF THE INVENTION

The present invention was developed to solve the aforementioned problems without sacrificing brightness, employing the following configurations.

An illumination optical system according to the present invention includes a lens array with a plurality of lenses for splitting light emitted from a light source into a plurality of sub-beams, at least some of the lenses of the lens array being decentered. The illumination optical system is characterized in that the thickness of each of the lenses constituting the lens array is adjusted such that a step difference at boundaries between the lenses falls within a predetermined step difference. For example, the predetermined step difference is such as to prevent a rounded edge, caused by the step difference, from occurring at the boundaries between the lenses upon manufacture of the lens array. This illumination optical system makes it possible to provide bright illumination and a reduced illumination margin. Therefore, the use of the illumination optical system for a projector makes it possible to prevent or suppress display shadows without sacrificing brightness when displaying an image.

Here, in the case where each of the lenses constituting the lens array is decentered for each column of lenses, it is preferable that the thickness of each lens is adjusted for each column. This makes it possible to reduce the step difference at boundaries of the lenses in each column.

In addition, in the case where each of the lenses constituting the lens array is decentered for each lens, it is preferable that the thickness of a lens is adjusted for each lens to make d/S equal to or less than a predetermined value where S is a vertical size x a horizontal size of each of the lenses and d is the step difference at the boundaries between the lenses. This makes it possible to reduce the step difference at all lens boundaries.

Furthermore, the illumination optical system preferably includes a polarization conversion element for providing the same polarization for each of the sub-beams split by the lens array. The system also preferably includes a superimposing lens for superimposing the sub-beams provided with the same polarization direction by the polarization conversion element on a predetermined position. This makes it possible to provide further increased service efficiency of light.

On the other hand, the projector according to the present invention includes an electro-optical device and employs the illumination optical system in which the thickness of the lenses constituting the lens array is adjusted as described above.

The projector according to the present invention may further include a color beam splitting optical system for splitting the light beams emitted by the illumination optical system into beams of three colors. The projector may also include a plurality of the electro-optical devices for modulating each of the color beams split by the color beam splitting optical system, a color beam combining optical system for combining modulated beams of each color, and a projection lens for projecting a combined beam.

These projectors can employ the illumination optical systems described above, thereby making it possible to prevent or suppress display shadows without sacrificing brightness.

DESCRIPTION OF THE PREFERRED EMBODIMENTS

Now, embodiments of the present invention will be explained below by way of example. In the following explanations, it is to be understood, unless otherwise specified, that light travels in the z-direction, the y-direction is at the 12 o'clock position with respect to the z-direction, and the x-direction at the 3 o'clock position.

Figure 1:
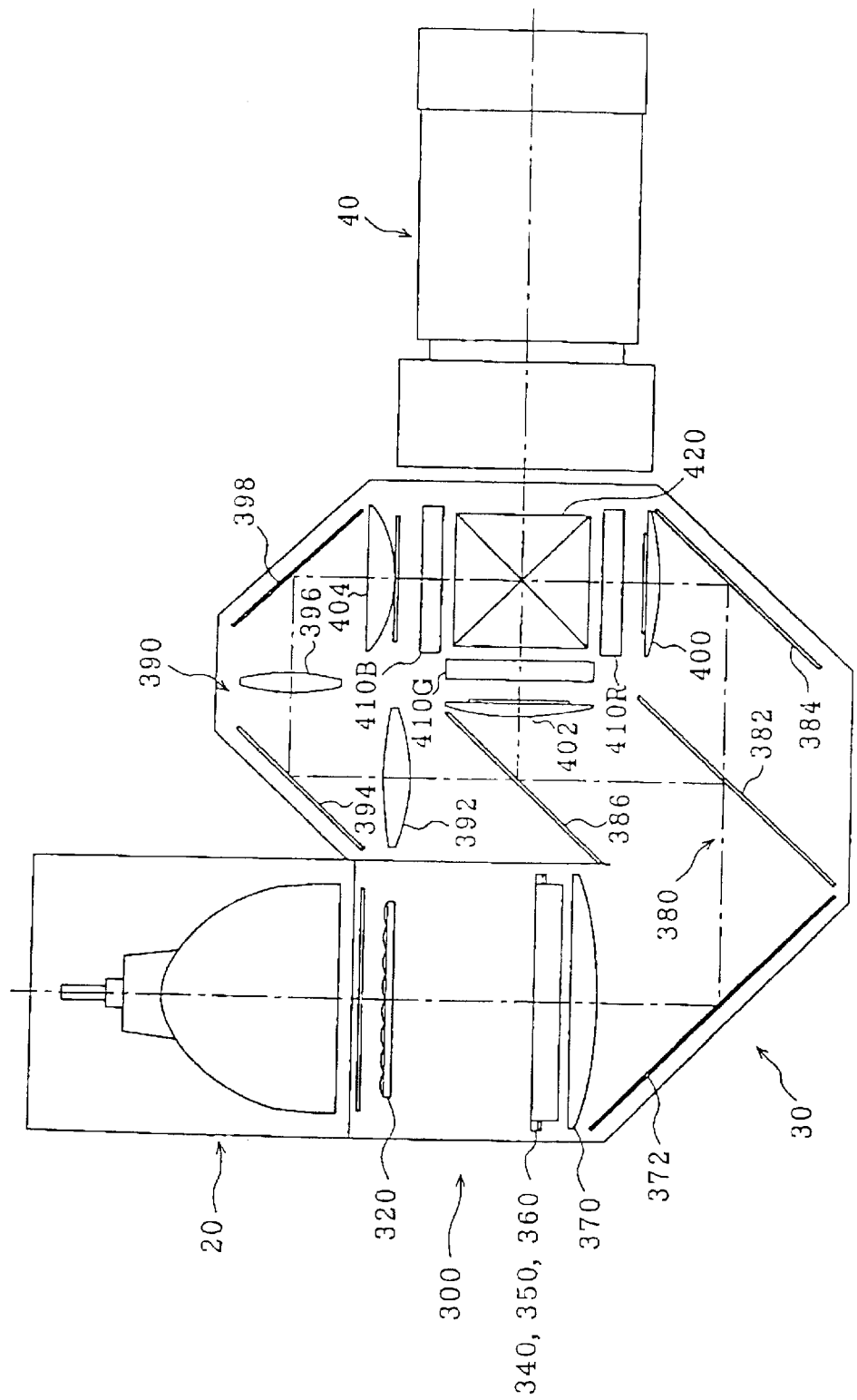
FIG. 1 is a plan view illustrating an optical system of a projector according to an embodiment of the present invention.
Figure 9:
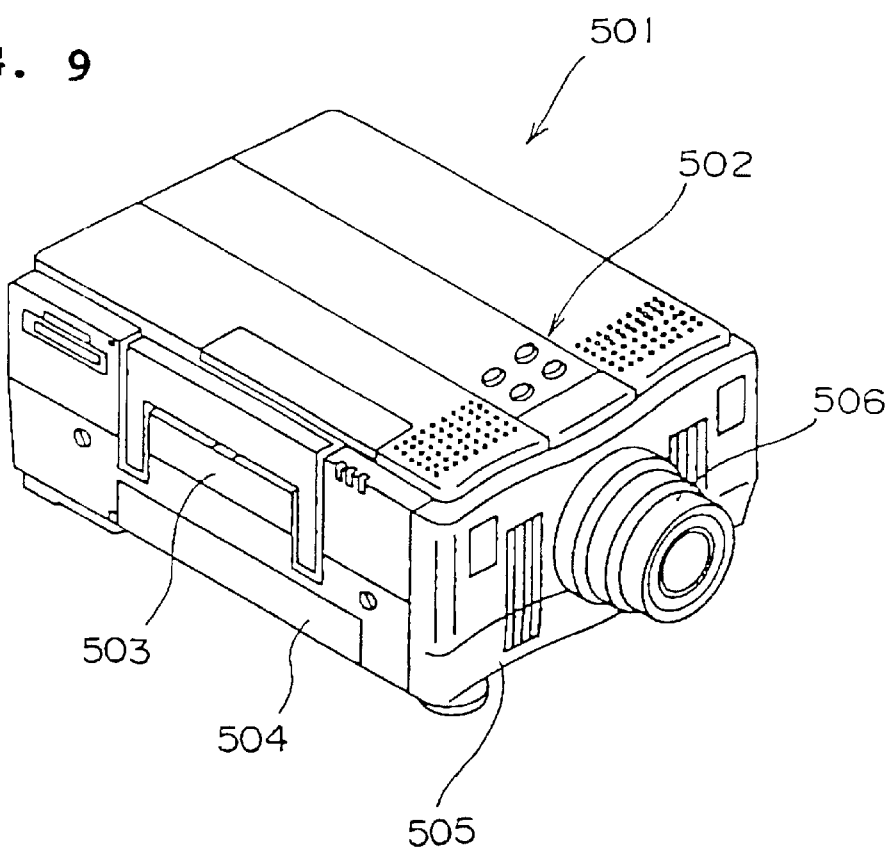
FIG. 9 is a perspective external view illustrating a typical projector.
Figure 10:
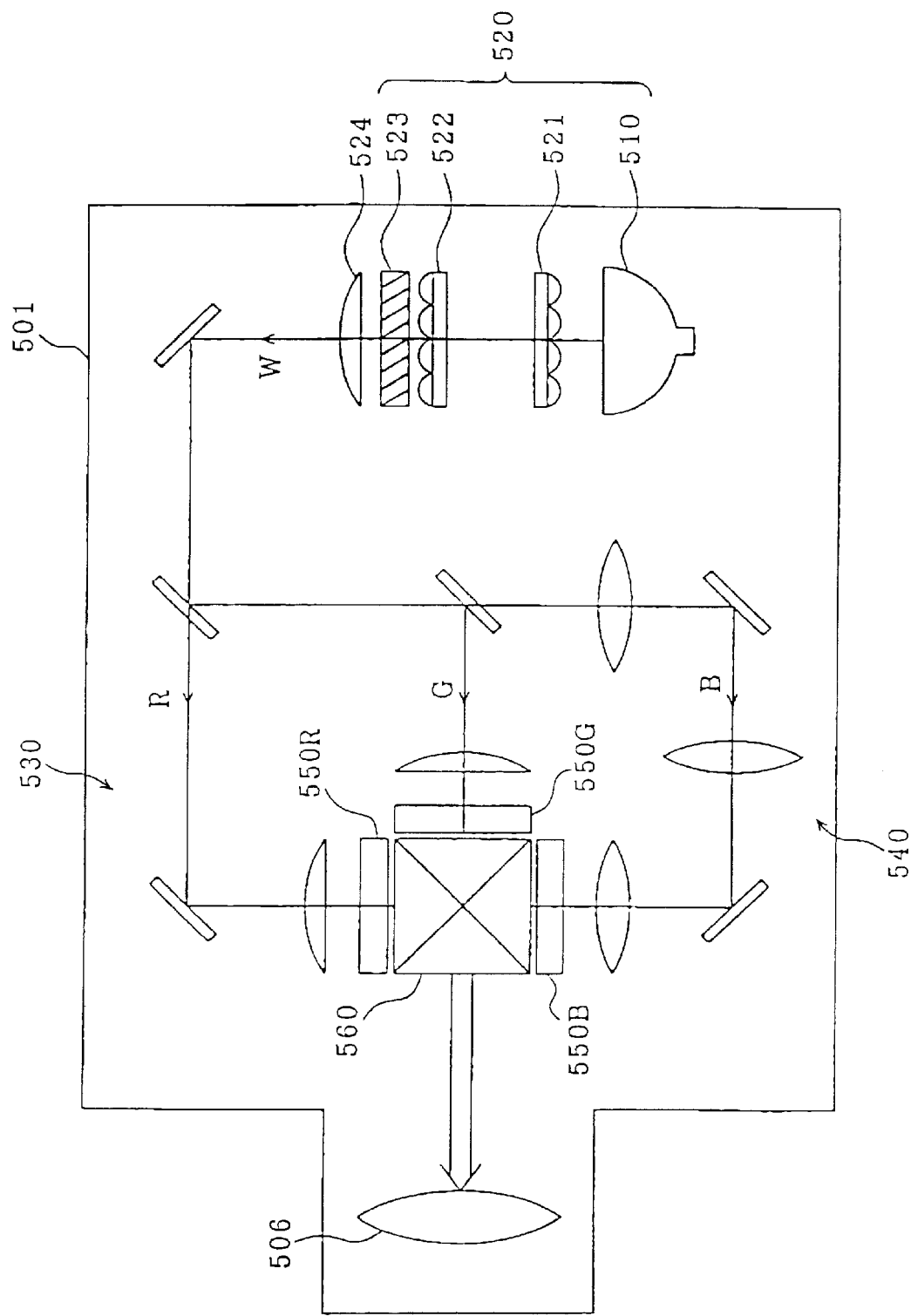
FIG. 10 is a view illustrating the configuration of an optical system of a known projector.
Figure 11:
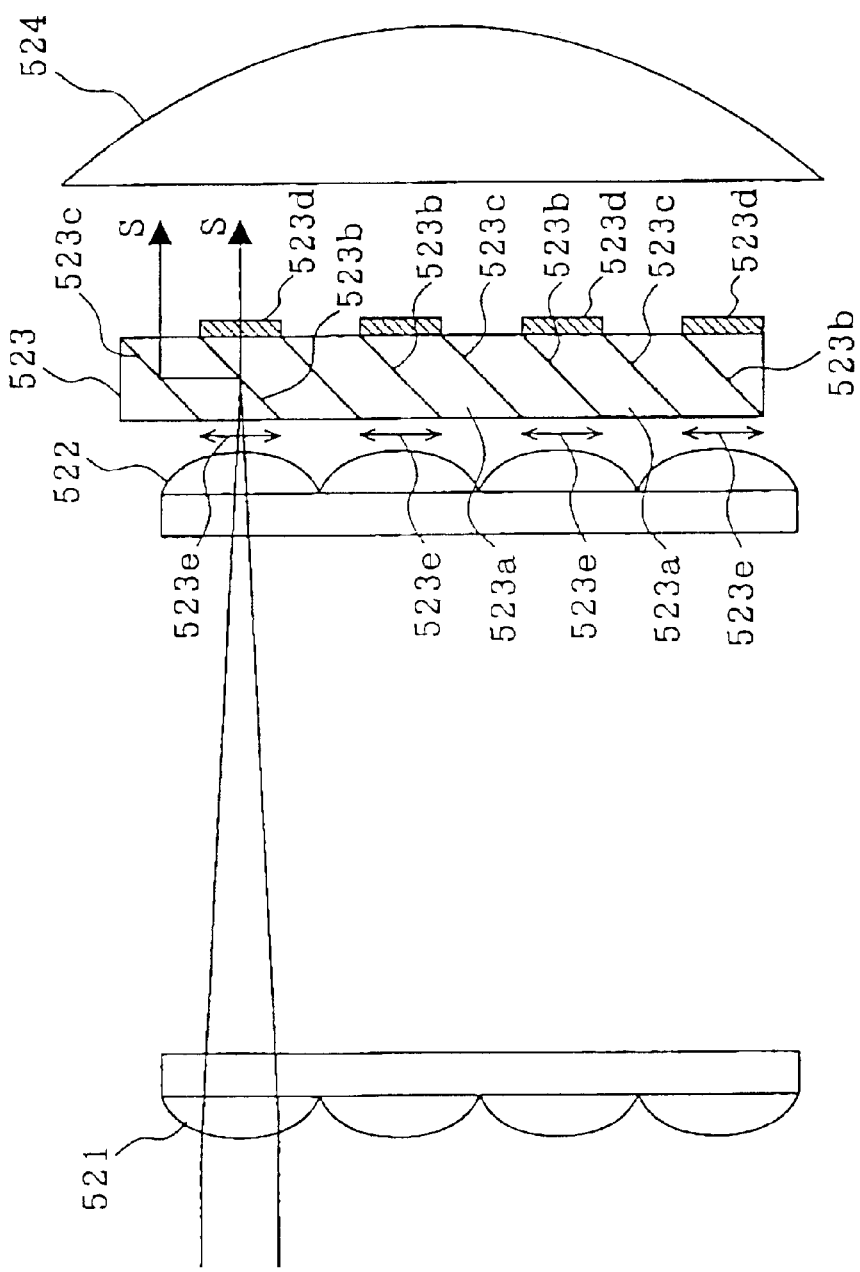
FIG. 11 is an enlarged view illustrating part of the illumination optical system constituting the optical system of FIG. 10.
Figure 12:
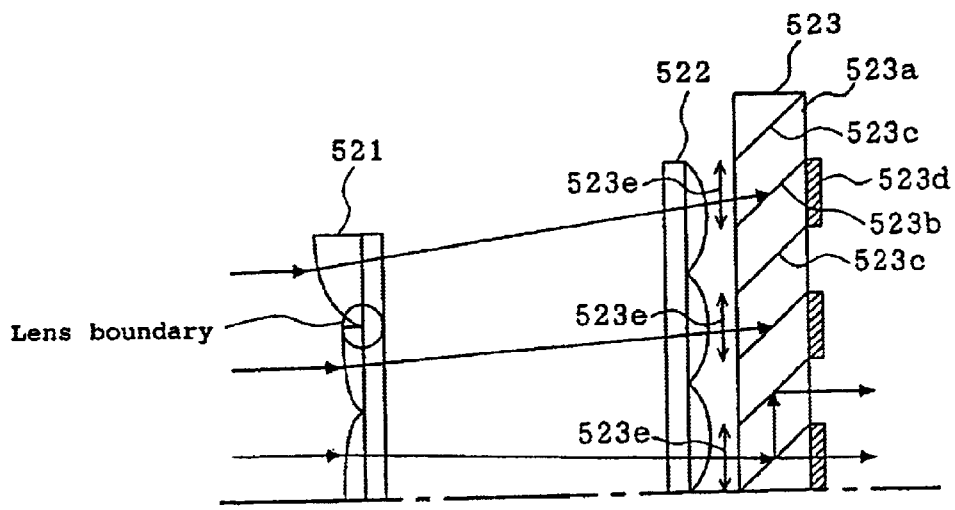
FIG. 12 is a schematic view illustrating the action of an illumination optical system which employs a conventional lens array as a first lens array.
Figure 13:
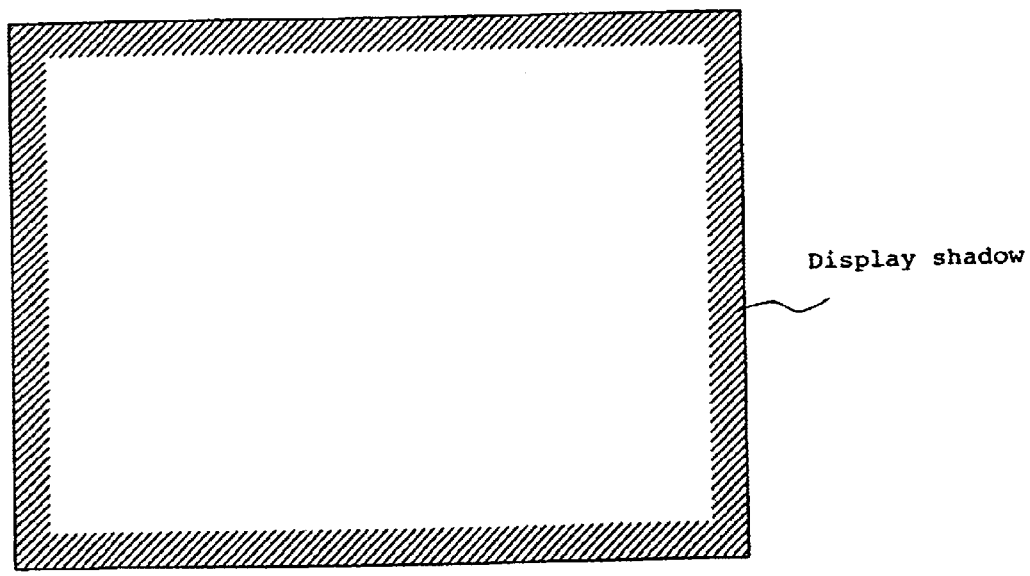
FIG. 13 is an explanatory view illustrating a display shadow that has occurred upon projection with a projector including the illumination optical system of FIG. 12.

FIG. 1 is a schematic plan view illustrating the configuration of an illumination optical system incorporated in a projector according to an embodiment of the present invention. The optical system includes three main portions: a light source unit 20, an optical unit 30, and a projection lens 40. Incidentally, the optical system is accommodated in such an armored package as previously described in FIG. 9.

The optical unit 30 includes an integrator optical system 300 to be described later; a color beam splitting optical system 380 provided with dichroic mirrors 382, 386 and a reflective mirror 384; and a relay optical system 390 having an incidence lens 392, a relay lens 396, and reflective mirrors 394, 398. The optical unit 30 further includes three field lenses 400, 402, 404; three liquid crystal panels 410R, 410G, 410B; and a cross dichroic prism 420 as a color beam combining optical system.

The light source unit 20 is disposed on the incidence side of a first lens array 320 of the optical unit 30, while the projection lens 40 is disposed on the emitting surface side of the cross dichroic prism 420 of the optical unit 30.

Figure 2:
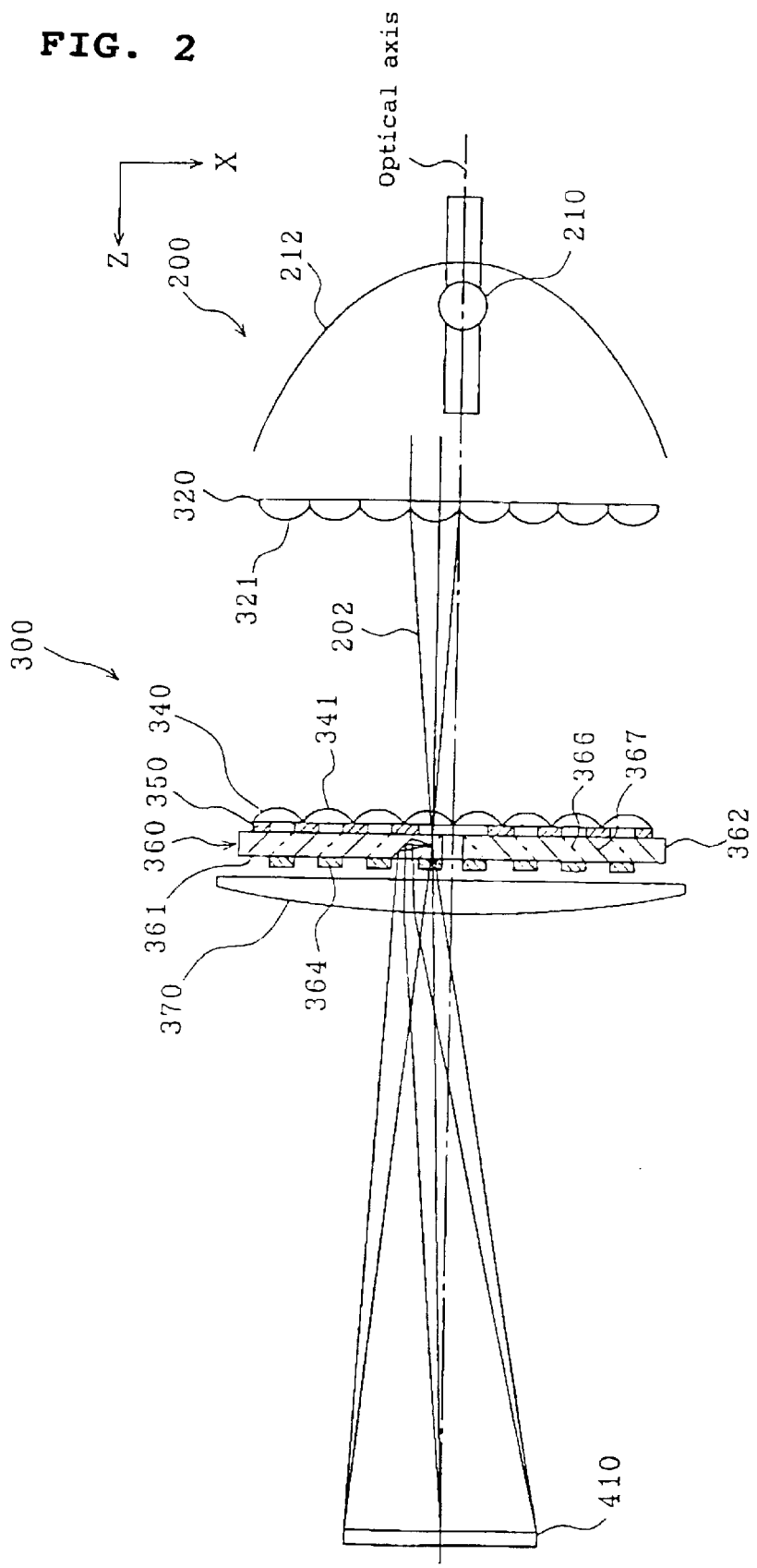
FIG. 2 is an explanatory view illustrating an illumination optical system constituting the optical system of FIG. 1.

FIG. 2 is an explanatory view illustrating an illumination optical system for illuminating the three liquid crystal panels which are the illumination areas of the projector shown in FIG. 1. The illumination optical system includes a light source 200 provided in the light source unit 20 and an integrator optical system 300 provided in the optical unit 30. The integrator optical system 300 has the first lens array 320, a second lens array 340, a shield plate 350 and a polarization conversion element array 360 to be described later, and a superimposing lens 370. The light source 200 includes a light source lamp 210 and a concave mirror 212. Radiated light emitted from the light source lamp 210 are reflected on the concave mirror 212 and then launched toward the first lens array 320 as substantially parallel beams of light. In this system, a halogen lamp, a metal halide lamp, or a high pressure mercury lamp can be employed as the light source lamp 210, while a parabolic mirror is preferably employed as the concave mirror 212.

Incidentally, for ease of explanations, FIG. 2 shows only main components required to explain the function of the illumination optical system.

Non-polarized light emitted from the light source 200 is split into a plurality of sub-beams 202 with a plurality of small lenses 321 of the first lens array 320 constituting the integrator optical system 300, while being condensed at the vicinity of polarization splitting films 366 of two polarization conversion element arrays 361, 362 via the second lens array 340. The plurality of sub-beams incident upon the two polarization conversion element arrays 361, 362 are converted into linearly polarized beams of one type, which are in turn transmitted therefrom. Then, the plurality of sub-beams transmitted from the two polarization conversion element arrays 361, 362 are superimposed on the liquid crystal panels 410R, 410G, 410B, described later, by means of the superimposing lens 370.

Figure 3:
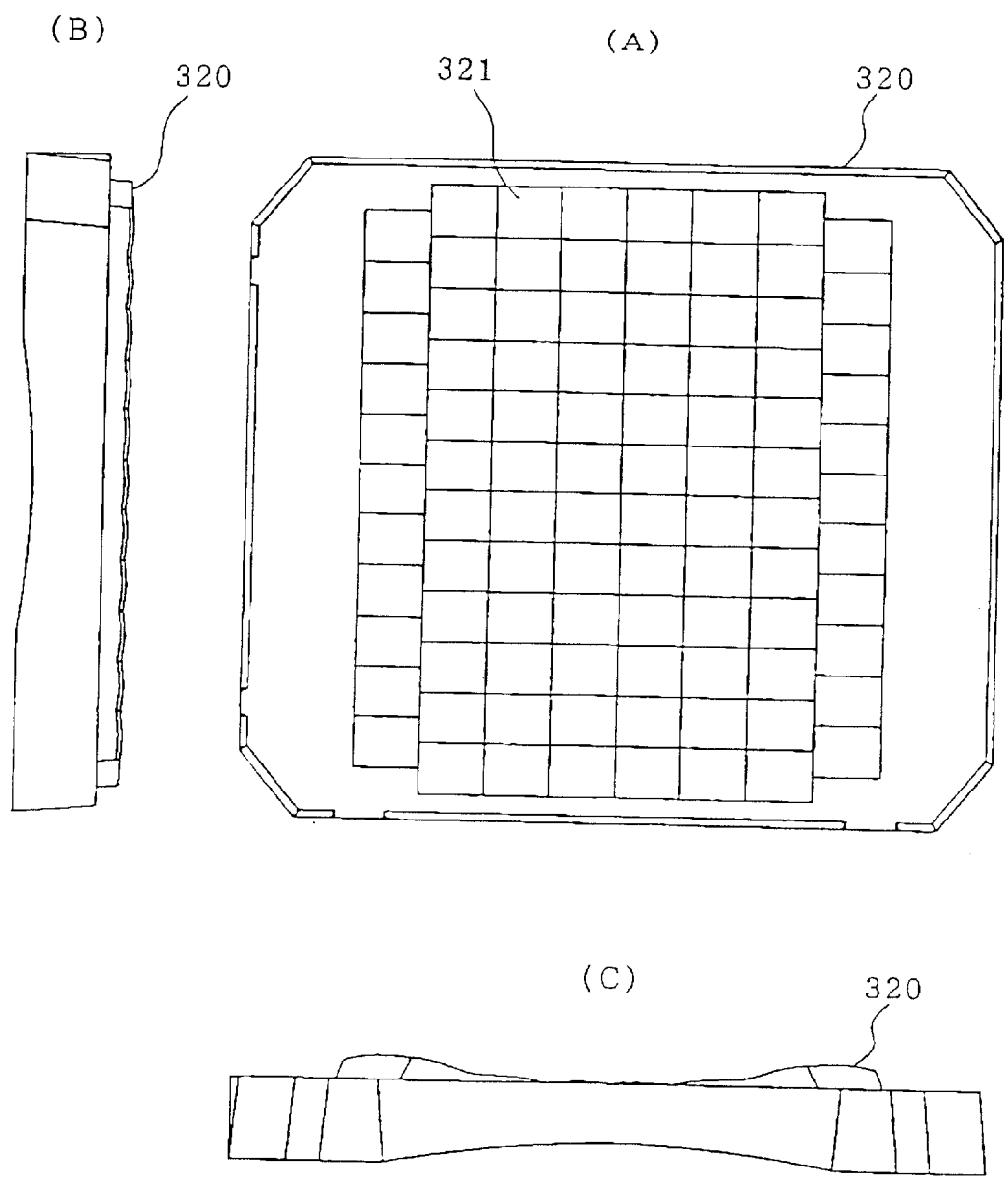
FIG. 3(A) shows a front view.
FIG. 3(B) shows a side view.
FIG. 3(C) shows a bottom view of a first lens array constituting the illumination optical system, illustrating the lenses of the array decentered for each column.

FIG. 3(A) shows a front view, FIG. 3(B) shows a side view, and FIG. 3(C) shows a bottom view, illustrating the external appearance of the first lens array 320. The first lens array 320 has small lenses 321 each having a rectangular contour and arranged in a matrix of 4×2 vertical columns and 12 horizontal rows (11 rows on the outermost sides). The lenses constituting the lens array are decentered for each column in order to expand the light laterally. That is, the optical axis of the small lenses in the same column is shifted in the same manner so as to be decentered from the geometric center of each of the small lenses.

In addition, when viewed from the z-direction, the outer shape of each of the small lenses 321 is so designed as to look similar to that of each of the liquid crystal panels 410R, 410G, 410B. For example, if the aspect ratio (i.e., the ratio of a horizontal to vertical dimension) of the image forming area of a liquid crystal panel is 4:3, the aspect ratio of each of the small lenses 321 is set to the ratio of 4:3.

As described above, since the first lens array 320 has the lenses decentered for each column, the surface shape of lenses in one column is different from those in another. For this reason, the thickness of lenses is adjusted for each column so as not to cause a step difference at their boundaries as far as possible. This makes it possible to prevent the occurrence of a rounded edge of the lenses during manufacture of the first lens array 320.

Figure 4:
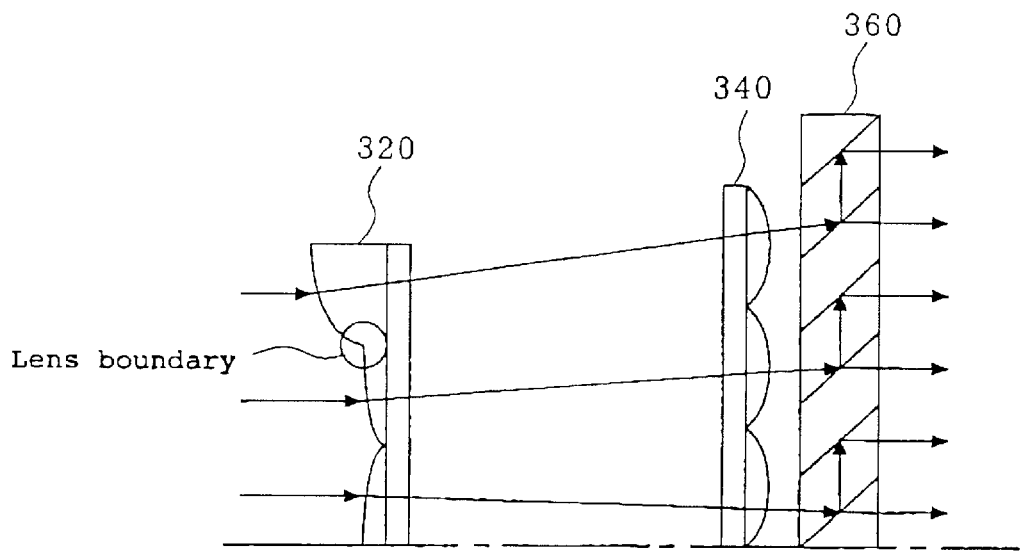
FIG. 4 is a schematic view illustrating the action of an illumination optical system which employs, as the first lens array, a lens array having no step difference at the lens boundaries in each column.

FIG. 4 is a schematic view illustrating the action of an illumination optical system which employs a lens array having no step difference at the lens boundaries, with the arrows indicating the traveling direction of light. In this system, since no step difference is present between the lenses, light can pass through the first lens array 320 without being blocked.

Incidentally, in the case where it is desired to illuminate the liquid crystal panels at a brighter level, the first lens array 320 is not decentered for each column as described above. It is preferable to employ a lens array in which the small lenses constituting the lens array are decentered for each lens, that is, the position of the optical axis of the small lenses is determined for each lens.

Figure 5:
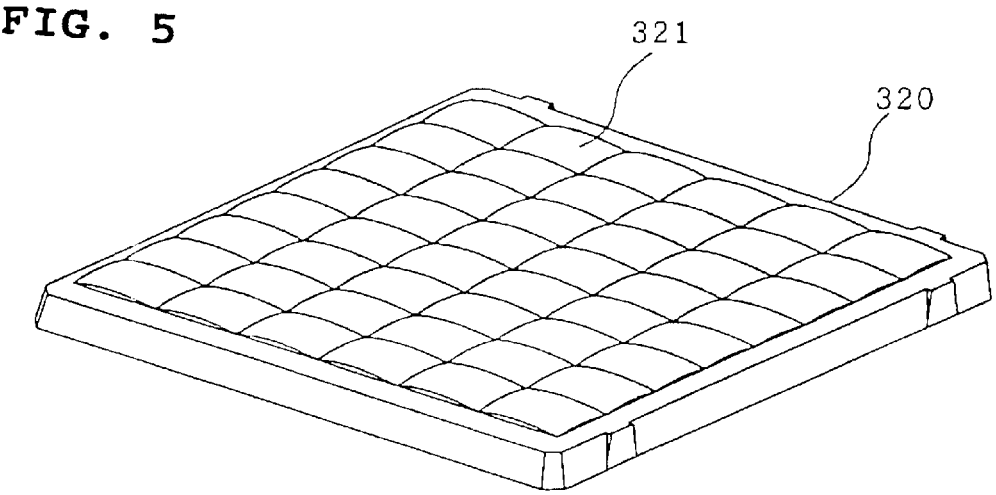
FIG. 5 is a perspective view illustrating the first lens array in which the lenses are decentered for each lens and the step difference between these lenses is adjusted to within a predetermined range.

In this case, the thickness of the lenses is adjusted for each lens in such a way that a step difference between the lenses at their respective boundaries becomes smaller as the size of the lenses decrease. For example, in the case where the lens employed has a vertical dimension of 5 mm and a horizontal dimension of 7 mm, if the maximum step difference at respective lens boundaries is 0.1 mm or less, it is substantially possible to prevent the so-called rounded edge during manufacture of the lenses. In other words, the step difference at respective lens boundaries is adjusted so that d/S is equal to or less than 0.1/35 where S is the vertical dimension× horizontal dimension of each lens and d is the step difference at respective lens boundaries. FIG. 5 is a perspective view illustrating the first lens array 320 formed as described above.

The second lens array 340 has a function of allowing a plurality of sub-beams transmitted from the first lens array 320 to be guided so as to be convergent on the polarization splitting films 366 of the two polarization conversion element arrays 361, 362. The second lens array 340 includes small lenses 341 which are the same in number as the lenses constituting the first lens array 320. Incidentally, the lenses of the first lens array 320 and the second lens array 340 may be oriented in either the positive or negative z-direction, or in the directions different from each other as shown in FIG. 2.

Figure 6:
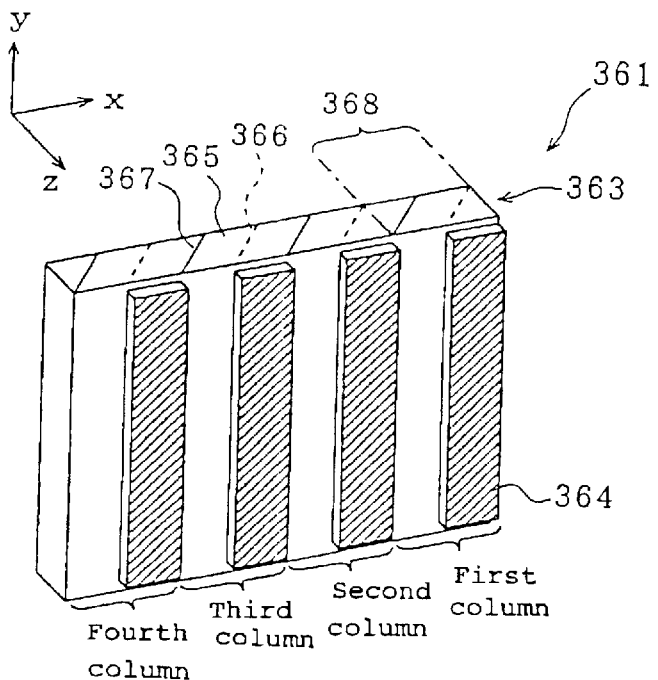
FIG. 6 is a perspective external view illustrating a polarization conversion element array.
Figure 7:
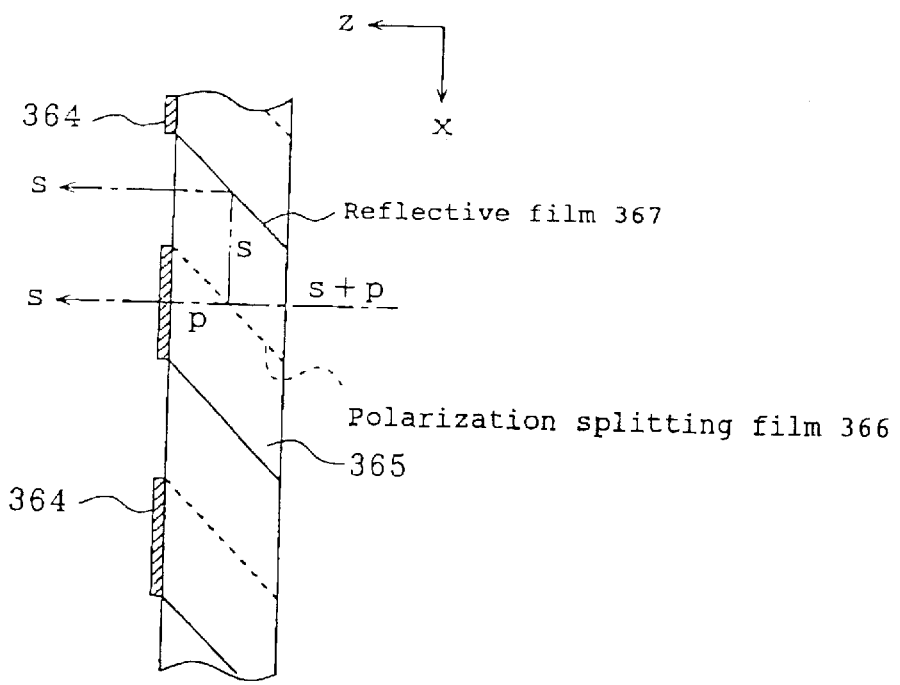
FIG. 7 is an explanatory view illustrating the action of the polarization conversion element array.

As shown in FIG. 2, the polarization conversion element array 360 is adapted such that the two polarization conversion element arrays 361, 362 are arranged symmetrically with respect to the optical axis. FIG. 6 is a perspective external view illustrating the polarization conversion element array 361. The polarization conversion element array 361 includes a polarizing beam splitter array 363 and half-wave plates 364 (shown by the diagonal lines) which are selectively arranged on part of the transmission surface of the polarizing beam splitter array 363. The polarizing beam splitter array 363 has a plurality of pillar-shaped parallelogram light transmissive members 365, one glued on another successively. At the boundaries of the light transmissive members 365, the polarization splitting film 366 and a reflective film 367 are alternately formed. The half-wave plates 364 are selectively glued on the mapping portions, which are for beams from the polarization splitting films 366 or the reflective films 367, of the light transmission surface in the x-direction. In this example, the half-wave plates 364 are glued on the mapping portions for the polarization splitting films 366, of the light transmission surface in the x-direction.

The polarization conversion element array 361 has a function of converting incident beams into one type of linearly polarized beams (e.g., s-polarized beams or p-polarized beams) for transmission. FIG. 5 is a schematic view illustrating the action of the polarization conversion element array 361. A non-polarized beam of light (an incident beam having a random polarization direction), which contains s- and p-polarization components and is incident upon the incidence side of the polarization conversion element array 361, is first split into an s-polarized beam and a p-polarized beam by means of the polarization splitting film 366. The s-polarized beam is reflected on the polarization splitting films 366 generally perpendicularly and further reflected on the reflective film 367, finally being transmitted therefrom. On the other hand, the p-polarized beam is allowed to pass through the polarization splitting film 366 remaining unchanged. The p-polarized beam that has passed through the polarization splitting film 366 goes through the half-wave plate 364 disposed on the transmission side of the p-polarized beam to be converted into an s-polarized beam and then transmitted therefrom. Therefore, most of the light that has passed through the polarization conversion element array 361 is transmitted as an s-polarized beam. Incidentally, in the case where it is desired to transmit the light from the polarization conversion element array 361 as a p-polarized beam, the half-wave plate 364 is disposed on the transmission side through which the s-polarized beam, reflected on the reflective film 367, is transmitted. Alternatively, so long as the same polarization can be provided, a quarter-wave plate may be employed or a desired phase plate may be provided on both the transmission sides of the p- and s-polarized beams.

In the aforementioned polarization conversion element array 361, one block which contains one polarization splitting film 366 and one reflective film 367, adjacent to each other, and which further includes one half-wave plate 364 can be considered as one polarization conversion element 368. The polarization conversion element array 361 includes a plurality of the polarization conversion elements 368 arranged in the x-direction. Incidentally, a polarization conversion element array 362 has the same configuration as that of the polarization conversion element array 361 and is not explained repeatedly.

Figure 8:
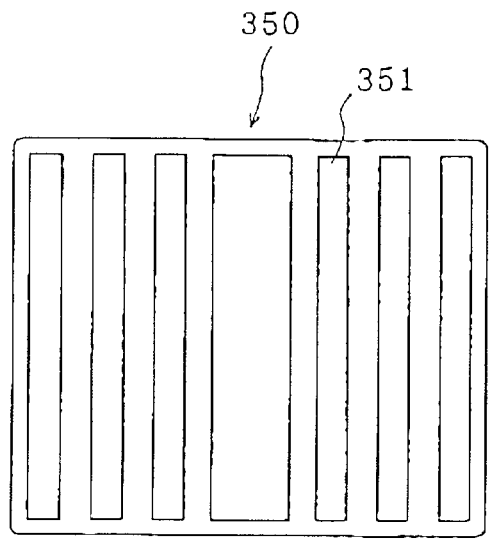
FIG. 8 is a front view illustrating a shield plate to be attached to the polarization conversion element array.

FIG. 8 is a front view illustrating the shield plate 350. The shield plate 350 has a configuration in which an opening portion 351 is provided on a generally rectangular plate-shaped body to allow light to impinge only upon the incidence side corresponding to the polarization splitting film 366 among the incidence sides of the two polarization conversion element arrays 361, 362.

A reflective mirror 372 shown in FIG. 1 is provided to guide the beam from the illumination optical system towards the color beam splitting optical system 380 and therefore not always required depending on the configuration of the optical system.

The color beam splitting optical system 380 includes the first and second dichroic mirrors 382, 386 and is provided with a function of splitting the light transmitted from the illumination optical system into three beams of red, green, and blue. The first dichroic mirror 382 transmits the red beam included in the beams transmitted from the superimposing lens 370 and reflects the blue and green beams. The red beam that has passed through the first dichroic mirror 382 is reflected on the reflective mirror 384, and then goes through a field lens 400 to reach the liquid crystal panel 410R designed for red light. The field lens 400 converts each of the sub-beams transmitted from the superimposing lens 370 into a beam parallel to the center axis (primary light ray). Other field lenses 402, 404 provided in front of the other liquid crystal panels 410G, 410B act in the same manner.

In addition, of the blue and green beams reflected on the first dichroic mirror 382, the green beam is reflected on the second dichroic mirror 386 and then reaches the liquid crystal panel 410G designed for green light through the field lens 402. On the other hand, the blue beam passes through the second dichroic mirror 386 and travels through the relay optical system 390 comprising the incidence lens 392, the reflective mirror 394, the relay lens 396, and the reflective mirror 398, and further the field lens 404 so as to reach the liquid crystal panel 410B designed for blue light. Incidentally, the relay optical system 390 is employed here in order to prevent a drop in service efficiency of light caused by the diffusion of light due to the optical path length of blue light longer than that of any other color light. In other words, the relay optical system 390 is employed to allow a sub-beam incident upon the incidence lens 392 to be transmitted remaining unchanged to the field lens 404.

The three liquid crystal panels 410R, 410G, 410B have a function of serving as an electro-optical device for modulating an incident beam in accordance with given image information (an image signal). Thus, a beam of each color incident upon the three liquid crystal panels 410R, 410G, 410B is modulated in accordance with given image information to form an image of each color.

Incidentally, the three liquid crystal panels 410R, 410G, 410B are provided, on the incidence and transmission sides thereof, with a polarizer (not shown).

The modulated beams of the three colors transmitted from the three liquid crystal panels 410R, 410G, 410B impinge upon the cross dichroic prism 420. The cross dichroic prism 420 has a function of serving as a color combining optical system for combining the modulated beams of the three colors to form a color image. The cross dichroic prism 420 is provided with a multi-layered dielectric film for reflecting a red beam and a multi-layered dielectric film for reflecting a blue beam, which are formed generally in the shape of a letter X at the boundaries of four rectangular prisms. These multi-layered dielectric films combine the modulated beams of the three colors, thereby forming a combined beam for projecting a color image. The combined beam generated by the cross dichroic prism 420 is transmitted towards the projection lens 40. The projection lens 40 has a function of projecting the combined beam onto a projection screen to display the color image on the projection screen.

The projector according to this embodiment allows the integrator optical system 300 to uniformly illuminate all parts of the liquid crystal panels 410R, 410G, 410B without producing display shadows corresponding to the boundaries of the lenses constituting the first lens array 320. Accordingly, the projector ensures a sharp high contrast all over an image upon displaying the image and prevents or suppresses display shadows without sacrificing brightness, thereby providing a high-quality image.

Incidentally, in the aforementioned embodiment, such an example has been explained in which the present invention is applied to a projection display system employing transmissive liquid crystal panels. However, the present invention can be applied to a projection display system employing reflective liquid crystal panels. In addition, as described later, the electro-optical device is not limited to the liquid crystal panel. Here, the word "transmissive" means that the electro-optical device such as a liquid crystal panel allows light to pass therethrough, whereas the word "reflective" means that the electro-optical device such as a liquid crystal panel allows light to be reflected. The projection display system employing a reflective electro-optical device uses a dichroic prism as color splitter means for splitting light into three beams of red, green, and blue. In some cases, the dichroic prism is also used as color combining means for combining modulated beams of the three colors to transmit the resulting beam in the same direction.

In addition, the electro-optical device for modulating light is not limited to the liquid crystal panel and may employ a micro mirror.

Furthermore, the prism serving as a color combining optical system is not limited to the dichroic prism having two types of color selection sides formed on the glued sides of the four triangular-pillar-shaped prism and may be a dichroic prism having one type of color selection side or a polarizing beam splitter, in addition, as the prism, a generally hexahedral optically light transmissive box may be employed in which light selection sides are disposed and a liquid is filled.

Furthermore, the projection display system includes a front projection display system for projecting an image from the viewing direction and a rear projection display system for projecting an image from the direction opposite to the viewing direction. The arrangement shown in the aforementioned embodiment is applicable to any one of these projection display systems.

The illumination optical system according to the present invention makes it possible to reduce a margin of illumination and provide bright illuminating light. Thus, the projector employing this illumination optical system can prevent or suppress display shadows without sacrificing brightness upon displaying an image.

What is claimed is:

1. A method for manufacturing a lens array provided with a plurality of lenses, at least some of said lenses of said lens array being decentered, said method comprising the step of
adjusting a thickness of each of said lenses to obtain a value of d/S therefor equal to or less than 1/350 to prevent rounded edges at boundaries between said lenses caused by a step difference at said boundaries, wherein S is a product of a vertical size and a horizontal size of each of said lenses and d is the step difference at each of the boundaries between said lenses.

2. The method of claim 1, wherein the thickness of each lens is adjusted to make said step difference at each of the boundaries between lenses equal to 0.1 mm or less.

3. An illumination optical system comprising a lens array provided with a plurality of lenses for splitting light emitted from a light source into a plurality of sub-beams, at least some of said lenses of said lens array being decentered, said lenses being arranged in adjacent relation and having adjoining boundary edges, each lens having a lens length in a vertical direction and a lens width in a horizontal direction, and forming a step difference d at a boundary with an adjacent lens, and wherein to prevent rounded edges of the boundaries between said lenses caused by the step difference upon manufacture of said lens array, a value of d/S is equal to or less than 1/350 wherein S is equal to a product of the length and the width of each of the lenses.

4. The illumination optical system according to claim 3, wherein
each of said lenses constituting said lens array is individually decentered and has a respective value of d/S.

5. The illumination optical system according to claim 3, further comprising
a polarization conversion element for providing the same polarization direction for each of said sub-beams split by said lens array, and
a superimposing lens for superimposing said sub-beams provided with the same polarization direction by said polarization conversion element on a predetermined position.

6. A projector comprising the illumination optical system according to claim 3, and an electro-optical device for modulating the light beams emitted by said illumination optical system.

7. The projector according to claim 6, further comprising
a color beam splitting optical system for splitting the light beams emitted by said illumination optical system into beams of three colors,
a plurality of said electro-optical devices for modulating each of the color beams split by said color beam splitting optical system,
a color beam combining optical system for combining modulated beams of each color, and
a projection lens for projecting the combined beams.

8. The projector according to claim 6, further comprising
a polarization conversion element for providing the same polarization direction for each of said sub-beams split by said lens array, and
a superimposing lens for superimposing said sub-beams provided with the same polarization direction by said polarization conversion element on a predetermined position.

9. The projector according to claim 6, wherein
each of said lenses constituting said lens array is decentered for each column of said lenses, and the thickness of each of said lenses is also adjusted for each column of said lenses.

10. The projector according to claim 6, wherein
each of said lenses constituting said lens array is individually decentered and has a respective value of d/S.

11. The illumination optical system according to claim 3, wherein said step difference is equal to or less than 0.1 mm.

12. The illumination optical system according to claim 3, wherein said lenses have rectangular boundaries and are arranged in a matrix of columns and rows.

13. The illumination optical system according to claim 12, wherein
each of said lenses constituting said lens array is decentered for each column of said lenses, and the thickness of each of said lenses is also adjusted for each column of said lenses.

14. The illumination optical system according to claim 12, wherein all of the lenses in said matrix are decentered.

* * * * *